Patented Sept. 26, 1939

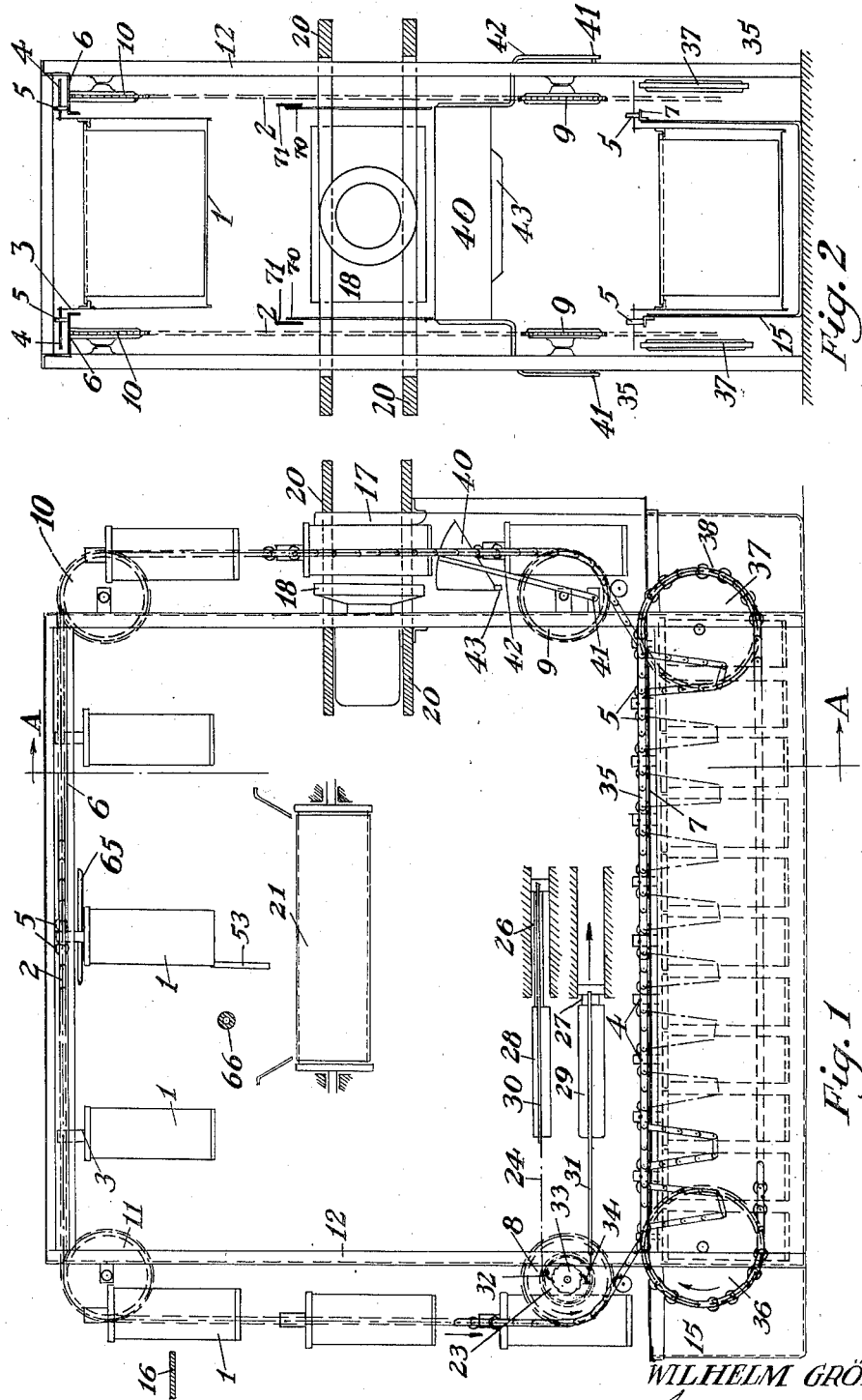

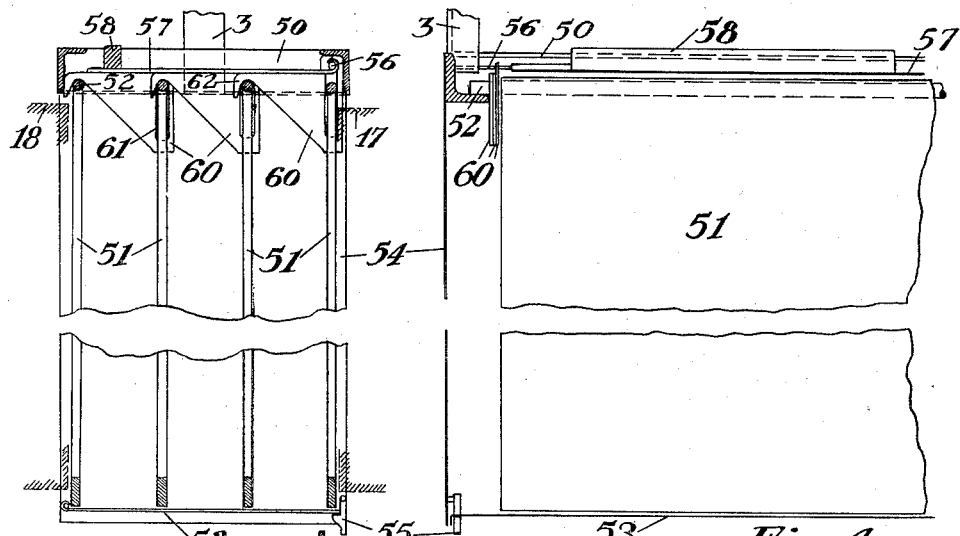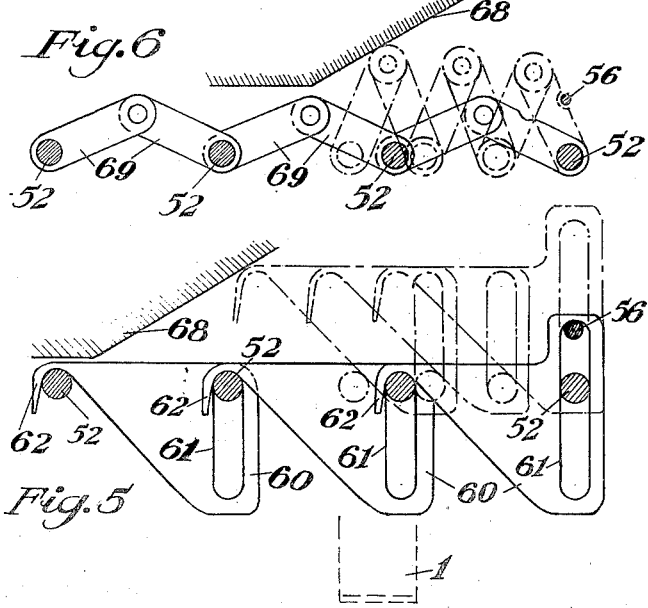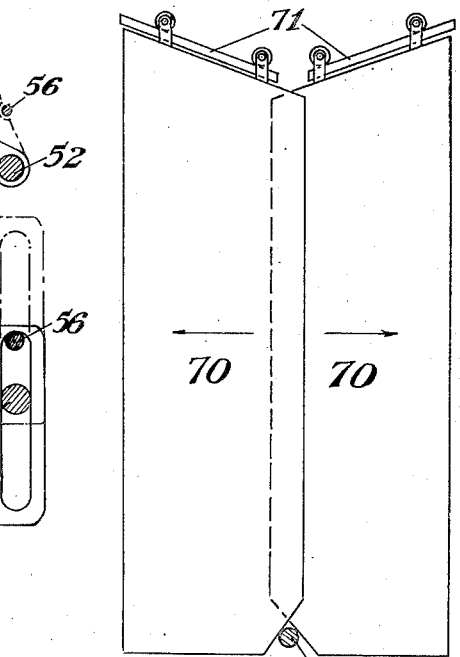

2,174,241

UNITED STATES PATENT OFFICE 2,174,241

APPARATUS FOR THE STEEPING OF ALKALI-CELLULOSE AND THE LIKE

Wilhelm Grötzinger, Stuttgart-Bad Cannstatt, Germany, assignor to Baker Perkins Company, Inc., Saginaw, Mich., a corporation of New York Application November 27, 1936, Serial No. 112,946
In Germany November 30, 1935

7 Claims. (Cl. 23—260)

This invention relates to the steeping of cellulose and like materials in caustic solution or other liquids and has for its object the provision of an improved apparatus for continuously carrying the material into and through the solution with which it is to be treated for a predetermined time, then removing the material from the liquid, extracting from the material the excess steeping solution, and discharging the treated material from the apparatus. For the purposes of illustration this specification will deal more particularly with the treatment of felted cellulose fiber with caustic solution, as a step in the manufacture of alkalicellulose and cellulose xanthate rayon.

Heretofore it has been desirable to perform all of the steps of the alkalicellulose manufacturing process continuously so as to realize the economies of straight-line production, but the steeping of cellulose in lye by a continuous process has heretofore been impracticable because of certain physical difficulties. The partly refined cellulose, ready for soaking and cleansing in lye or caustic soda solution, is generally in the form of a continuous sheet of loosely felted material resembling blotting paper. This continuous band of the felted cellulose could not be treated by a continuous process because of the length of time necessary for steeping and the consequent length and complexity of apparatus for so treating an endless sheet of the material. In order to keep the size of the treating vats and the amount of caustic solution required within practical limits it has been necessary to cut the cellulose felt into sheets of manageable size, stack them loosely in a basket or other container, and place the containers individually in steeping tanks for alkalizing. In order to maintain an economical rate of production a great number of individual steeping tanks have been required for this batch method of treatment and a great deal of labor is required for handling the separate containers.

A principal feature of the invention consists of a novel conveyor system for carrying stacked cellulose sheets in containers of novel construction through a vat of caustic solution, past means operatively associated with the conveyor mechanism for pressing excess solution from the treated cellulose in the containers, together with means for automatically discharging the treated material from the containers.

A secondary feature of the invention includes a novel arrangement of the conveying means for the containers whereby the normal spacing of the containers from each other is automatically reduced to a fraction of normal during dipping of the cellulose, so that a steeping tank and associated apparatus of the least possible size for its capacity may be used.

Another feature of the invention is an improved container for the stacked cellulose sheets, arranged to permit pressing of the treated sheets in a hydraulic press, together with novel means for maintaining proper spacing of the pads of sheets in the container, means for automatically restoring that spacing after pressing of the stacked sheets, and means for automatically discharging the treated and pressed cellulose from the container and for preparing the container for loading with fresh batches of untreated cellulose.

Further objects and advantages of the invention will be set forth in the following description, and are shown in the accompanying drawings, in which like numerals are employed to designate like parts throughout the same.

Fig. 1 is a diagrammatic side elevation of a cellulose-treating apparatus according to the invention, Fig. 2 is a sectional end view of the apparatus taken along line AA of Fig. 1, Fig. 3 shows one of the improved containers for cellulose sheets, carried by the conveyor of Figs. 1 and 2, Fig. 4 is a longitudinal section through the container of Fig. 3, Fig. 5 shows diagrammatically the novel means for spacing the blocks of cellulose sheets in the containers, and for separating the same after they have been pressed to remove surplus solution, Fig. 6 shows a modification of the spacing means of Fig. 5, Fig. 7 is a diagrammatic side elevation of a novel drip-pan, or funnel, and valve mechanism, operating synchronously with the conveyor drive and the hydraulic press for catching and disposing of caustic solution expressed from the treated cellulose, and Fig. 8 shows a baffle wall assembly for preventing splashing the solution during the pressing of the treated material in the containers.

Referring to the drawings, Figs. 1 and 2 show a plurality of containers 1, for holding and carrying blocks or pads of stacked cellulose sheets, suspended at spaced intervals from a pair of conveyor chains 2 by means of butt straps 3 (shown in detail in Figs. 3 and 4) hung upon chain-roller pintles 4. The chains 2 travel through the upper horizontal conveyor run on rollers 5 along tracks 6 at the top of a frame 12. The conveyor chains 2 pass over four pairs of sprockets, 8 through 11, which are journalled at the corners of the conveyor frame 12, as seen in Fig. 1. The length of the continuous chains 2 is such that in the lower horizontal conveyor run a substantial amount of slack is available to permit closing up the normal pitch interval between the containers 1 carried by the chains.

Beneath the lower run of the conveyor, as shown in Figs. 1 and 2, an elongated steeping vat 15 is provided to hold the solution with which the material in the containers is to be treated. In the manufacture of alkalicellulose, herein described for purposes of illustration, a solution of caustic soda or lye is employed.

The length of the vat and of the lower horizontal conveyor run is determined by the number of containers 1 to be treated at one time, the speed of the conveyor, and the duration of the period required for the treatment of the cellulose or other material.

At the left of Fig. 1 a platform 16 is indicated, where blocks of cellulose sheets are loaded into containers 1 for treatment. From this point the loaded containers are carried downward (as shown by the arrow) into the vat 15, through which they are carried (to the right in Fig. 1) by novel mechanism to be described hereafter. At the end of the vat 15 they emerge from the solution and travel upwardly between the stationary anvil 17 and pallet 18 of a hydraulic press of the usual construction, which is mounted in a strong frame 20, indicated diagrammatically. Here the excess steeping solution is removed from the cellulose and disposed of by means and in a manner described below. Beneath the upper horizontal run of the conveyor a belt conveyor 21 is located to receive the alkalized and pressed cellulose from the containers 1 and carry it from the apparatus for further manufacturing treatment.

The conveyor carrying the containers may be given its step-by-step travel by any of several known mechanisms. A preferred novel form of drive mechanism is shown in Fig. 1. On a through shaft to which sprockets 8 are fixed a third sprocket wheel 23 is rotatably mounted. A drive chain 24 passes over sprocket 23 and has its two free ends connected to pistons 26 and 27, by rods 30 and 31 respectively which operate under tension. Pistons 26 and 27 are slidable respectively in hydraulic cylinders 28 and 29. The equal travels of the pistons are so proportioned to the diameters of sprockets 23 and 8 that at each stroke the conveyor chains 2 are advanced one pitch distance (i. e. the distance between adjacent containers 1). Piston 26, as shown in Fig. 1, is smaller in diameter than piston 27, and the fluid supply to its cylinder is metered and governed in known manner so that the chain 24 is kept constantly under tension. The sprocket 23 carries a spring pawl 32 which cooperates with a ratchet-wheel 33 fixed to the shaft of sprockets 8. In this inner position, shown in Fig. 1, piston 27 is under no pressure and is retained in that position by the tension on the chain 24 exerted by piston 26.

When fluid pressure is applied to cylinder 29, piston 27 travels in the direction of the arrow, rotating sprocket 23 counterclockwise. By the action of pawl 32 upon ratchet-wheel 33 the conveyor sprockets 8 are rotated in the same direction. When piston 27 reaches the outer limit of its travel in the cylinder 29, valve gear of known kind, (not shown), operates to interrupt the fluid supply to the cylinder and the piston 26 draws the chain 24 and piston 27 in the opposite direction. The sprocket 23 is thus moved clockwise, backing the pawl 32 over ratchet 33 while sprockets 8 and the conveyor chains remain stationary. To lock sprockets 8 during this reverse travel of the pistons, a spring pawl 34, fixed to a stationary axis, is located to engage and hold the ratchet-wheel 33 against backward travel.

The same valve gear which governs the operation of piston 27 is also coupled in known manner to the control mechanism of the hydraulic press so that during the intervals when the conveyor 2 is at rest the press will engage the contents of that container 1 which is positioned between its pallet 18 and anvil 17.

The operations of the conveyor 2, its associated hydraulic drive mechanism, and the synchronously governed hydraulic press follow this general cycle. Containers 1 are loaded at station 16 during the idle travel of piston 27 and the drive mechanism, while the conveyor 2 is at rest. The conveyor then carries the filled containers ahead one pitch distance, moving the next container into loading position at 16. This step-by-step motion continues, carrying the loaded containers into the bottom horizontal run of Figs. 1 and 2, where by the action of novel mechanism to be described the distance between them is closed up, and they are carried in close order through the caustic solution in vat 15. As they reach the exit end of the vat (to the right in Fig. 1) they are lifted from the solution, their original spacing is restored, and they are carried one at a time into position between the pallet 18 and anvil 17 of the hydraulic press. Here each container remains stationary for engagement by the press during each period of rest of the conveyor, and, by the action of the known valve mechanism referred to, the press is actuated to remove from the cellulose in the container the excess caustic solution carried from the vat 15. The pressed cellulose sheets are then carried into the upper horizontal run of the conveyor where, by means to be described later, the bottoms 53 of the containers are opened automatically to discharge sheets onto conveyor 21, which carries them to the next step in the process of manufacture.

A novel feature of the invention is the arrangement of the conveying apparatus whereby the normal spacing or pitch distance of the containers 1 is materially reduced, so that the containers can travel through the vat 15 close together. If the normal pitch required to prevent interference of the containers in the vertical runs were maintained in the horizontal dipping run, an exceedingly long steeping vat 15 would be required to permit treatment of the cellulose of the necessary duration. To reduce this normal interval between containers, a second pair of conveyor chains 35 is provided along both sides of the vat 15. Two pairs of sprockets 36 and 37 at opposite ends of the vat 15 carry the chains 35. The sprockets 36 and 37 are driven from the shaft or driving gear of sprocket 8 by gearing not shown at a speed materially less than that of chains 2, thus proportionately reducing the intervals between adjacent containers 1. As the containers 1 pass around sprockets 8 and reach the tops of sprockets 36, their pintles 4 are received in notches 38 in the links of chains 35, shown in Figs. 1 and 7. The containers hang from notches 38 throughout their travel lengthwise of the vat 15, the links of the attached conveyor chains 2 meanwhile hanging in loops as shown in Fig. 1.

Beneath the hydraulic press 17, 18 I provide a drip pan or funnel 40 to receive and drain away the excess caustic solution which is squeezed from the cellulose in the containers 1. To keep the receptacle 40 from interfering with the passage of the containers 1, means is provided for swinging it clear of the conveyor 2 during the periodic movements of that conveyor. The receptacle is carried by tiltable arms 42 which are journaled on axes 41, and its underside is inclined for engagement and displacement by containers 1 so that upon each such engagement it is swung into the position shown in dotted lines in Fig. 7 to permit passage of the container 1. In either position the outlet spout 43, at the bottom of funnel 4 is positioned over a stationary funnel 44, which in turn drains into a two-way valve 45. This valve has 2 alternative outlets 46 and 47. The outlet 46 is piped to vat 15. Through it the so-called "yellow" caustic solution, which is pressed from the cellulose when the solution is still new and which is still usable for treating purposes, is returned to the vat. The outlet 47 is connected to a waste tank where the "black" caustic solution which cannot be further used in treatment of the cellulose is collected.

The valve 45 is operatively coupled in known manner to one of the hydraulic pistons 26, 27, or to some other part of the press and conveyor driving and timing mechanism, so that during the initial pressing of the cellulose the caustic solution extracted from it is passed through outlet 47 to the waste liquor receptacle or sewer. This solution first expressed contains most of the dirt dissolved from the material. As the pallet 18 moves on to the end of its travel completing the pressing of the cellulose, the valve is turned so that the cleaner solution extracted from the cellulose sheets during the final portion of the pressing flows through outlet 46 back into the vat 15. By thus automatically discarding the solution first squeezed from the cellulose after the initial pressure has been applied, and then returning the cleaner solution back into vat 15, a considerable portion of the clean solution is saved for further use in steeping the cellulose, and at the same time the solution in the vat is kept substantially clean. Only enough fresh caustic solution must be added to the vat to replace the solution pressed from the cellulose and discarded as unfit for re-use. This improved apparatus for automatically "skimming off" the spent solution is applicable not only to the continuously operating apparatus shown but also can be used in connection with the older batch process referred to above.

A further feature of the invention is the novel container 1 and associated parts for carrying the blocks or pads of cellulose sheets, designed to permit effective pressing of the cellulose, and subsequently to separate the pressed sheets automatically and discharge them onto conveyor 21. Referring to Figs. 3 through 5, and 8, each container consists of a rim in the form of a flanged frame 50, to which are rigidly secured the butt straps 3 and the spindles 4 already referred to. From the flanges of frame 50 a number of perforated metal separator plates 51 are hung, by pegs 52 extending laterally to rest upon the flanges at opposite sides of the container. The container has a bottom closure 53 hinged to one of its side walls 54 and releasably secured to the opposite side wall by spring latches 55. A cover plate 57 is hinged to the frame 50 at 56 and is held in place by a weight 58. The function of the weighted cover 57 is to prevent the stacked cellulose sheets held between the plates 51 from floating above the surface of the caustic solution when the container is in the caustic bath in vat 15. To space tin plates 51 from each other to permit the free flow of lye solution between them, strips 60 are placed along both sides of each container between the plates, suspended by slots 61 and hooks 62 from the suspension pegs 52 of adjacent separator plates 51 (see Fig. 5).

The operation of the container, separators 51, and spacing members 60 just described is as follows: A container is filled with cellulose sheets at platform 16, which are lowered in loose stacks of approximately equal size between the separator plates 51, which take the relative positions shown in Fig. 3. The filled container then travels down the vertical run of Fig. 1 until it is lowered into vat 15 and is taken over by the horizontal conveyor chains 35. In the machine herein described for purposes of illustration the intervals on chain 35 are proportioned to the speed of the chain so that there are always 11 containers in the vat. With a time interval of 3 minutes between consecutive conveyor movements, each container and its contents is subjected to a dipping for a period of 33 minutes. After the container leaves the dipping vat at the right in Fig. 1, it passes the movable funnel 40 and comes to rest at the hydraulic press. The receptacle 40 then swings beneath the container 1. The pressure pallet 18 then moves to the right by fluid pressure, bearing against the separator plates 51 and against the anvil 17, to extract the caustic solution from the cellulose sheets until they contain only a predetermined residue. After this pressing the container travels step-by-step to the unloading station at conveyor 21, a stationary dog engages the latch 55 holding the bottom 53. The bottom 53 drops open so that the cellulose sheets can slip from between the separator plates 51 (see Fig. 1). A rigid rail 65 is positioned close above the containers at the unloading station to hold each container steady while it is emptied. Shortly before the emptied container reaches the loading station 16 the bottom 53 engages a roller 66 which swings it back to its closed position in which latch 55 locks it.

When the press 17, 18 engages the two outer separators 51 constituting the front and back walls of a container 1, the intervening separators are pressed tightly together. Their suspension pegs 52 slide along the lower inclined edges of the wedge-shaped plates 60 (see Fig. 5). This lifts the plates 60 to the raised position indicated by dotted lines. After the pressing they tend to remain in this position, due to the adhesion of separators 51 to the cellulose sheets, and must be restored to their original spaced position to release the treated cellulose and permit new pads of cellulose sheets to be loaded between the plates 51. Therefore fixed abutment ramps 68 are provided in the upper run of the conveyor positioned to be engaged by the spaced plates 60. As the separator supporting pins 52 are carried by the conveyor to the left in Fig. 5, the bevelled abutment 68 urges the raised plates 60 downward, wedging the pins 52 apart and restoring the separators to their original spacing.

Fig. 6 shows alternative means for respacing the separator plates 51. A pair of pivotally joined links 69, are pivoted also to pegs 52, so that they may fold into the position shown in dotted lines when the plates 51 are pressed together. The operation is identical with that of the device of Fig. 5 engagement with cam surface 68 spreading the pegs 52 and separators 51 by the toggle action of links 69.

The operation of the hydraulic press 17, 18 upon the stacked cellulose in containers 1 occasionally causes caustic solution to spurt laterally from the material. To protect the conveyor frame and the chains 2 against wetting and corrosion by the liquid, I have provided a novel splash-plate assembly associated with the conveyor structure. Referring to Fig. 8, this assembly consists of a pair of plates 70 suspended from and laterally slidable along trolley rails 71, which are inclined downwardly toward their intersection. The length of the rails 71 and the width of plates 70 are such that the plates normally overlap, as shown. The splash deflector assembly described is installed at either side of the conveyor at the press 20, inside of the adjacent conveyor chains 2, as indicated diagrammatically in Fig. 2, but is omitted from Fig. 1 to avoid a confusing amount of detail in that view.

In operation, as a container 1 moves upward to the press each of its suspension pins enters a V-shaped opening between the overlapping edges of the plates, and separates them sufficiently to permit the passage of the pin between them. As the container nears the pressing station its suspension pegs 4 leave the laterally displaced plates 70, and their weight causes them to slide down tracks 71 and close the gap between their edges while the pressing operation is performed. While this feature has been shown and described in association with particular containers and conveyor structure, it can be adapted for use with conveyors and material supporting means of many kinds without departing from the invention. For instance it is well suited for use with the conveyor of a continuous finishing plant at paint-spraying stations, and the like.

Various changes and modifications in individual elements of the apparatus described may be made without departing from the spirit of the invention. Also, certain of the novel elements may be used by themselves or with other apparatus. For example the two-way valve assembly, operably connected to the press, may be employed profitably in the earlier used apparatus referred to above which extracted caustic solution from the individually handled batches of cellulose. It is also applicable to many other filter-press processes for the removal of solvents or other liquids from treated materials, wherein the first liquid pressed from the outside of the mass of material is more dirt-laden than that later extracted from the inside of the mass and filtered through the outer layers or portions.

Having thus described my invention, what I claim and desire to secure by Letters Patent is:

1. Apparatus for manufacture of alkalicellulose and the like, comprising in combination conveyor means including a horizontal treating run and a return run, containers for cellulosic material pivotally mounted thereon, said conveyor means, a vat to contain treating solution located beneath the treating run of said conveyor through which the conveyor means carries said containers, means for imparting to said conveyor means a step-by-step travel, pressure means located beyond said vat for pressing excess treating solution from the cellulose in said containers, means for actuating said pressure means in timed relation to the step-by-step travel of the conveyor, and means beyond said pressure means for discharging the treated cellulose from the containers.

2. Apparatus as claimed in claim 1, including a second conveyor having a horizontal run parallel to the treating run of the first-named conveyor, the treating run of said first conveyor having a substantial amount of slack, and means located along said second conveyor for engaging said containers and carrying them through the treating vat, said container-carrying means being spaced apart at intervals substantially shorter than the normal pitch intervals of the containers in the other runs of said first-named conveyor.

3. Apparatus as claimed in claim 1, including in combination a funnel for receiving liquid expressed from the treated material, located beneath said pressure means and movable into and out of receiving position beneath said press, in timed relation to the motion of said conveyor to clear the path of the containers during their movement, means for receiving the solution intercepted by said funnel, a two-way valve connecting said receiving means and conduits arranged to direct said solution alternatively to waste or back to the treating vat, and means associated with said pressure means for actuating said two-way valve in timed relation to the operation of said press, whereby the first fluid expressed from the cellulose is automatically sent to waste and the following clean fluid is returned to said vat.

4. Apparatus for dipping or treating materials in liquid, comprising in combination an endless chain conveyor having a substantially horizontal treating run, said treating run including a substantial amount of slack, a plurality of containers pivotally mounted permanently on said conveyor at spaced intervals, a vat for the treating solution beneath said treating run, a slow-moving second conveyor having a horizontal run parallel to the treating run of said first conveyor and driven in timed relation to the travel of said first conveyor, and means spaced apart on the horizontal run of said second conveyor for successively engaging said containers and carrying them through the solution in said vat, the spacing of said container-engaging means and the speed of said second conveyor being such that the containers in the vat are spaced apart at intervals substantially shorter than their normal pitch intervals in other runs of said first conveyor, the first chain conveyor hanging in slack bights between its points of pivotal attachment to said containers.

5. In apparatus for treating cellulose in caustic solution, including a vat for said solution, pressure means for extracting excess solution from the treated cellulose, and conveying means for successively carrying the cellulose through said vat, to said press, and away from the press, in combination, containers carried by said conveyor, each of said containers comprising side frame members, and a hinged bottom member, a top frame, separator plates adapted to be movably suspended from said top frame substantially parallel to each other, wedge-shaped spacing members loosely suspended from the tops of adjacent separator plates and yieldable upwards when the separator plates and the cellulose between them are pressed together, an inclined abutment means in the path of travel of said conveyor beyond said press for engagement by said spacing members as the containers are carried past to urge the spacing members downward between said separator plates to restore said plates to their original spaced relation.

6. In a conveyor for carrying treated cellulose to and away from pressure means for extracting excess treating liquid from the cellulose, in combination a container for the cellulose having a top frame, parallel separator plates movably suspended from said frame, means for yieldably holding said separator plates in spaced relation, said spacing means being displaceable upwardly when said plates are urged together by said pressure means, and inclined abutment means beyond said pressure means in the path of travel of said spacing means adapted to be engaged by and urge said spacing means downward to restore said separator plates to their original spaced relation.

7. In apparatus for continuously treating cellulose comprising a conveyor having a pair of parallel chains, containers pivotally suspended from pintles of said chains, and a power press cooperatively associated with a vertical run of said conveyor for consecutively engaging and pressing batches of cellulose in said containers, in combination, splash deflecting means located adjacent said press at the sides of said conveyor and between the paths of the chain and containers, each of said deflecting means comprising a pair of normally overlapping plates mounted for edgewise motion apart and together, having means at their lower ends for engagement by said pintles, whereby upward movement of a pintle and container urges said plates apart to present a slot between their edges for the upward passage of said pintle, said plates returning to their overlapping position and closing the slot after the pintle has passed from between them.

WILHELM GRÖTZINGER.